United States Patent
Fritz et al.

(10) Patent No.: US 10,987,982 B2
(45) Date of Patent: Apr. 27, 2021

(54) ABOVE-BED GOOSE NECK TOWING APPARATUS

(71) Applicant: HORIZON GLOBAL AMERICAS INC., Plymouth, MI (US)

(72) Inventors: Erik Fritz, New Boston, MI (US); Matt Dunlavey, Ann Arbor, MI (US); Kevin Garner, Swartz Creek, MI (US); Brian Ward, Swartz Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 187 days.

(21) Appl. No.: 15/909,204

(22) Filed: Mar. 1, 2018

(65) Prior Publication Data
US 2018/0250992 A1    Sep. 6, 2018

Related U.S. Application Data

(60) Provisional application No. 62/465,182, filed on Mar. 1, 2017.

(51) Int. Cl.
| | |
|---|---|
| *B60D 1/06* | (2006.01) |
| *B60D 1/48* | (2006.01) |
| *B60D 1/52* | (2006.01) |
| *B60D 1/60* | (2006.01) |
| *B64D 27/24* | (2006.01) |
| *B64D 33/04* | (2006.01) |

(Continued)

(52) U.S. Cl.
CPC ............. *B60D 1/06* (2013.01); *B60D 1/065* (2013.01); *B60D 1/485* (2013.01); *B60D 1/488* (2013.01); *B60D 1/52* (2013.01); *B60D 1/60* (2013.01); *B64D 27/24* (2013.01); *B64D 33/04* (2013.01); *B64D 37/30* (2013.01); *F02K 7/08* (2013.01); *F05D 2220/60* (2013.01); *F05D 2240/35* (2013.01)

(58) Field of Classification Search
CPC . B60D 1/00; B60D 1/06; B60D 1/065; B60D 1/48; B60D 1/485; B60D 1/488; B60D 1/52; B60D 1/60
See application file for complete search history.

(56) References Cited

U.S. PATENT DOCUMENTS

| | | |
|---|---|---|
| 3,336,051 A | 8/1967 | Dale |
| 4,283,073 A | 8/1981 | Gostomski |

(Continued)

OTHER PUBLICATIONS

Bulldog BX1, posted by ETrailer.Com, reviewed date Jul. 26, 2012, © ETrailer.com, [online], [site visited Jun. 1, 2017]. Available from Internet, <URL: https://www.etrailer.com/comparison.aspx?pc=BD1289200300&pc2=GCSQ25000>.

(Continued)

*Primary Examiner* — Ruth Ilan
*Assistant Examiner* — Maurice L Williams
(74) *Attorney, Agent, or Firm* — McDonald Hopkins LLC

(57) ABSTRACT

An above-bed, gooseneck hitch and component mounting system is described. The system includes a pair of intersecting rails which overlap via an interlocking and/or coping joint, thereby forming an X-shape frame. The gooseneck connection is disposed at the central intersection of the rails, and optional quick connect/disconnect safety chain hooks and/or component ports may be integrated on one or more of the legs emanating from the central intersection.

13 Claims, 2 Drawing Sheets

(51) Int. Cl.
*B64D 37/30* (2006.01)
*F02K 7/08* (2006.01)

(56) References Cited

U.S. PATENT DOCUMENTS

| | | | |
|---|---|---|---|
| 4,699,395 A | 10/1987 | Hale | |
| 5,354,087 A | 10/1994 | Head | |
| 5,382,109 A | 1/1995 | Nyman | |
| 6,095,545 A * | 8/2000 | Bol, II | B60D 1/06 280/491.1 |
| 6,158,761 A * | 12/2000 | King | B60D 1/01 280/495 |
| 6,234,509 B1 | 5/2001 | Lara | |
| 6,520,528 B2 * | 2/2003 | Fandrich | B60D 1/06 280/491.5 |
| 6,776,431 B1 | 8/2004 | Dick | |
| 7,097,193 B1 | 8/2006 | Sievert | |
| 7,793,968 B1 * | 9/2010 | Withers | B60D 1/015 280/415.1 |
| 8,783,705 B2 | 7/2014 | Drake | |
| 8,910,924 B2 | 12/2014 | Alanko | |
| 9,849,738 B2 * | 12/2017 | Guthard | B60D 1/015 |
| 2003/0001362 A1 | 1/2003 | Ebey | |
| 2003/0047908 A1 | 3/2003 | Lara | |
| 2003/0173757 A1 | 9/2003 | Smith | |
| 2005/0253361 A1 | 11/2005 | Bouwkamp | |
| 2009/0295122 A1 * | 12/2009 | Withers | B62D 53/08 280/476.1 |
| 2010/0084837 A1 | 4/2010 | Quiring | |
| 2010/0109285 A1 * | 5/2010 | Stanifer | B60D 1/02 280/433 |
| 2012/0145851 A1 * | 6/2012 | McCoy | B60D 1/488 248/221.11 |
| 2012/0211966 A1 | 8/2012 | Drake | |
| 2013/0193671 A1 * | 8/2013 | McCoy | B60D 1/28 280/495 |
| 2013/0277944 A1 | 10/2013 | Drake | |
| 2013/0307248 A1 * | 11/2013 | McCoy | B60D 1/015 280/495 |
| 2015/0102584 A1 * | 4/2015 | Hartleip | B60D 1/065 280/511 |
| 2015/0217608 A1 | 8/2015 | Rabska | |
| 2016/0361961 A1 * | 12/2016 | McGory | B60D 1/488 |
| 2017/0305218 A1 | 10/2017 | Stanifer | |

OTHER PUBLICATIONS

Bulldog BX1, posted by ETrailer.Com, reviewed date Jul. 26, 2012 , © ETrailer.com, [online], [site visited Dec. 2, 2016]. Available from Internet, <URL: https://www.etrailer.com/comparison. aspx?pc=B D 1289200300&pc2=GCSQ25000>.

Bulldog 3-Inch Ball Gooseneck Coupler, posted by Bruce Smith, posted date Feb. 25, 2014, © 2016 Hardworking Trucks, [online], [site visited Dec. 2, 2016]. Available from Internet, <URL: http://www.hardworkingtrucks.com/28090/>.

Bulldog Gooseneck Coupler, Croft Trailer Supply, posted at CroftTrailer.com, posting date not given, ©1939-2016 CroftTrailer.com, [on line], [site visited Sep. 8, 2016]. Available from Internet, <URL: http://www.crofttrailer.com/bx1sq-40k-3-bulldog-goose neck-couple r-with-adjustable-pipe-40-000-lb-capacity /#page=page-1 >.

Bulldog BX1, posted by ETrailer.Com, reviewed date Jul. 26, 2012 , © ETrailer.com, [online], Available from Internet, <URL: https://www.etrailer.com/comparison. aspx?pc=B D 1289200300 &pc2=GCSQ25000> and website https://www.etrailer.com/Gooseneck-Trailer-Coupler/Bulldog/BD1289040300.html [site visited Oct. 10, 2017].

European Patent Office; International Search Report and Written Opinion for International Application No. PCT/US2018/020407; dated Jul. 20, 2018.

* cited by examiner

ABOVE-BED GOOSE NECK TOWING APPARATUS

RELATED APPLICATIONS

This application claims priority to U.S. Provisional Patent Application No. 62/465,182, filed on Mar. 1, 2017, which is incorporated by reference herein.

TECHNICAL FIELD

The present invention is generally related to a towing apparatus and, more particularly, to an gooseneck hitch mounting system disposed on an upper or top facing of the vehicle (e.g., the bed of a truck).

BACKGROUND

Many vehicles are designed to transport freight, goods, merchandise, personal property, and other such cargo. Often, a hitch assembly is utilized to connect a towed vehicle or trailer to a towing vehicle, such as a truck, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and mid-sized trailers, such as boat trailers, are better suited for gooseneck trailer hitches. In addition to the differences in load capacity, another difference between gooseneck and fifth wheel hitches is that the former uses a ball and coupler while the later relies on a kingpin and pin receiver.

In either case, trailers and towed apparatus are connected to a towing vehicle by way of a ball hitch secured to the vehicle and a ball socket coupling mechanism on the trailer. The mechanism mounts over the ball and, thereby, allows for the trailer to pivot behind the towing vehicle. Safety chains may also be employed as a secondary means of connection between the rear of the towing vehicle and the front of the towed vehicle.

Due to the size and weight of many trailers, it is preferable to evenly balance and distribute the weight of the trailer over the wheels of the towing vehicle. This is best accomplished by connecting the hitch to the frame or base of the towing vehicle, near the vehicle's center of gravity.

Accordingly, fifth wheel and gooseneck hitches mounted to pickup trucks are often connected to the truck frame underneath the bed of the truck. The mounting rails may be permanently fixed to the frame of a vehicle, such as a pickup truck. For example, the mounting rails may be connected between two portions of a pickup truck frame underneath the truck bed. The mounting rails may include a plurality of holes for receiving connection points from the hitch apparatus, with corresponding openings cut into the truck bed to allow for connection of underbed mounted rails. Examples of such under-bed mounting connections can be found in U.S. Pat. Nos. 7,793,968; 7,828,317; 9,067,468; and 9,150,067 (all of which are incorporated by reference herein). Still other types may be found in U.S. Pat. No. 5,472,222

In certain instances, users may prefer to have the connection apparatus mounted in the truck bed itself, so that the connection apparatus is more easily accessible. Additionally, by disposing the connection apparatus in the truck bed, the vehicle retains better clearance between its underside and the ground. Examples of such systems can be found in International Patent Publication WO2012/078851; United States Publication 2017/0217268; and U.S. Pat. No. 6,158,761.

Irrespective of whether above bed or below bed, most of these systems tend to rely on an H- or I-shaped series of orthogonally aligned support members and/or elongate arms. The arms are parallel and evenly spaced apart, joined via one or more "body" sections to bridge the gap. As such, these systems normally require casting, welding, and/or rails which add cost and weight.

Additionally, a number of these above bed systems are specifically configured to allow a gooseneck system to attach to attach to existing and/or separately provided $5^{th}$ wheel underbed apparatus and, in some instances, to create an elevated attachment away from the vehicle load bed (e.g., by way of a series of upwardly disposed and/or curving arms). While the elevated location might simplify attachment, it requires additional material and structural strength to maintain the integrity of the system when a load is attached. Thus, here again, these elevated systems tend to be heavier and more expensive.

In view of these shortcomings, a system and method that allows for gooseneck and other hitch and component connections from the top side of the vehicle (e.g., within the truck bed) is needed.

SUMMARY

An above-bed, gooseneck hitch and component mounting system is described. The system includes a pair of intersecting rails which overlap via an interlocking and/or coping joint, thereby forming an X-shape frame. The gooseneck connection is disposed at the central intersection of the rails, and optional quick connect/disconnect safety chain hooks and/or component ports may be integrated on one or more of the legs emanating from the central intersection.

Thus, in one aspect of the invention, a gooseneck hitch assembly may incorporate any combination of the following features:
- a pair of intersecting cross members formed into an X shape;
- a receptacle formed at a central intersection of the plurality of members;
- mounting points provided at opposing ends of each cross member;
- wherein the mounting points include at least one of: direct-to-puck connections and quick disconnect mechanisms;
- at least one attachment point formed on a top-facing of at least one of the cross members with a receiving opening of the receptacle also exposed along said top-facing;
- wherein the mounting points are formed on an under-facing of each cross member, said under-facing defining an opposite side of the assembly relative to a receiving opening of the receptacle;
- wherein the mounting points connect to a vehicle's load bed; and
- a flat, planar cover plate positioned on top of the cross members and having an through-aperture aligning with a receiving opening on the receptacle.

In additive or alternative aspect of the invention, a gooseneck hitch assembly may incorporate any combination of the following features:

- a first cross member having mounting points formed in a bottom-facing side at opposite ends of the cross member;
- a second cross member having mounting points formed in a bottom-facing side at opposite ends of the cross member;
- wherein the first cross member has a cope or interlocking cut centered at a midpoint of the first cross member to connect with a corresponding cut in the second cross member centered at a midpoint of the second cross member;
- wherein a receptacle having a top-facing opening is formed in the midpoints of the first and second cross members;
- wherein the first and second cross members, when connected, are symmetrical;
- wherein the first and second cross members, when connected, form a pair of supplementary angles in which each supplementary angle includes one acute angle and one obtuse angle;
- wherein the acute angles are transversely opposed and the obtuse angles are longitudinally opposed;
- wherein the first and second cross members have a plurality of symmetrically formed, top-facing mounting points;
- wherein the attachment points are recessed hooks or quick connect/disconnect mechanisms;
- wherein a cover plate having an optional skirt is attached to a top-facing of the first and second cross members, said cover plate having a through-opening aligned with the receptacle;
- wherein the mounting points of the first and second cross members include at least one of: direct-to-puck connections and quick disconnect mechanisms; and
- wherein the mounting points attach to a top-facing of a vehicle's load bed.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. Reference to a the underside or bottom- or under-facing of any component will be understood to mean the portion of that component normally facing the ground when the assembly is installed, whereas the top, exposed, or top- or upper-facing is on the opposite side thereof.

In the drawings.

DETAILED DESCRIPTION

Figure 1:
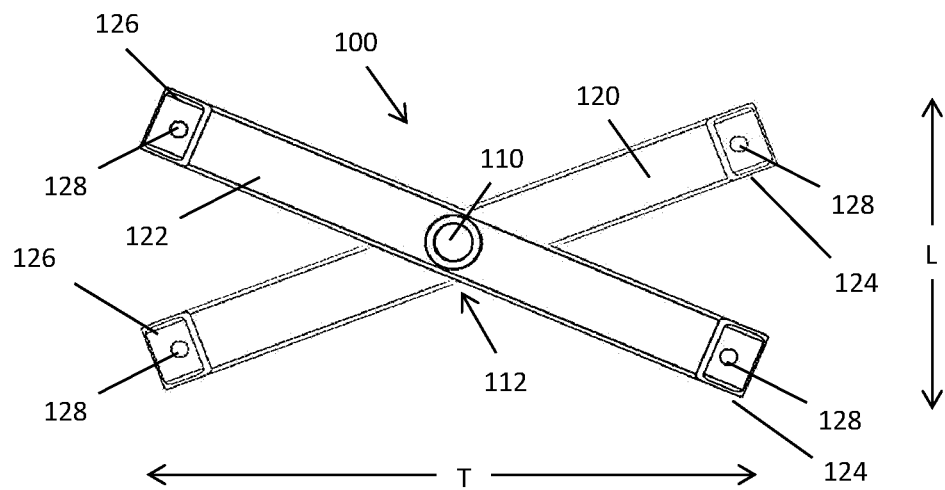
FIG. 1 is a top plan view of the hitch apparatus according to certain aspects disclosed herein.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

With reference to FIGS. 1-5, hitch apparatus 100 is particularly well-suited to accommodating gooseneck hitches via a hitch ball or direct puck assembly (not shown) via the central receptacle 110. Apparatus 100 is characterized by intersecting cross-members 120, 122, which are arranged in an X-shape. Preferably, cross members 120, 122 are of similar or identical construction, in terms of length, thickness, height, width, weight, materials, and/or cross sectional shape (relative to the length of the cross member). The members 120, 122 may be formed as hollow tubes, I-beams, C-shaped beams, T-shaped beams, or solid members. A combination of these features may be incorporated along the length of each member 120, 122 in some aspects. The members themselves can be monolithically formed, via casting, forging, and the like, to ensure strength and continuity, with steel or similar metals and/or alloys being the preferred material of choice. In all cases, the cross members 120, 122 are essentially straight, so as to simplify manufacture of the members and the overall assembly.

In some aspects, the X-shape of members 120, 122 defines four distinct angles in which the opposing angles are congruent. Further, the hitch apparatus is mounted within the truck bed so that the transverse length defined by arrow T and longitudinal length L. The transverse length T is greater than the longitudinal length L. In this manner, the apparatus 100 may have an elongated X-shape when viewed from the top. Notably, length T must be equivalent to or greater than the spacing of the vehicle's frame rails.

At the intersection 112 of members 120, 122, the members are scribed with a coping and/or interlocking cut. The cut may be at the midpoint so as to afford relative interchangeability of all parts, or the cut may be offset relative to the height of the members 120, 122. It may be possible to make a permanent attachment of the cross members 120, 122 by way of appropriately placed adhesive or to establish a selective or temporary attachment by way of interlocking and/or snap fit flanges, fasteners, or other similar structures. The positioning of such attachment members should be accomplished with an eye toward equal and even distribution of loads born by the apparatus 100, and it will be understood that such attachment is not necessary. In fact, the cope cut of the members 120, 122 should be sufficient to maintain the integrity of the apparatus on its own, particularly with respect to distributing the anticipated loads evenly and effectively while maintaining solid contact and connection with the vehicle load bed.

Receptacle 110 is situated at the intersection 112. In some aspects, the receptacle 110 may penetrate through both cross members 120, 122. In other aspects, the receptacle 110 may be fixed in only the member 122 laying atop the apparatus 100. Receptacle 110 is of sufficient size and shape to receive standard sized hitch balls that are attachable to a gooseneck hitch receiver, although quick disconnect hitch balls may be used. In the same manner, the receptacle 110 may be utilized for other accessories or towing attachments. Receptacle 110 may be integrally formed in one or both cross members 120, 122, or it can be subsequently bored or shaped into each.

The terminal ends 124, 126 (respectively speaking) of each cross member 120, 122 are adapted for easy attachment to the truck bed. In one aspect, apertures may receive fasteners or other tie-down mechanisms which cooperate with corresponding apertures or loops formed on the vehicle and, more preferably, attached directly to the frame of the vehicle via an underbed system that protrudes or is accessible through the load bed of a vehicle, such as 5$^{th}$ wheel underbed attachment system. In another aspect, mounting points 128, such as quick disconnect direct-to-puck, are integrally formed on or attached to ends 124, 126. Mounting points 128 are specifically formed to cooperate with corresponding points attached to the vehicle itself and, more specifically, to the vehicle frame, with appropriate contact afforded by apertures or extenders that penetrate the truck bed to allow for attachment of the apparatus 100 on the top of the bed.

An optional cover plate 130 may be fitted over or attached to the apparatus. In one aspect, the cover plate 130 is substantially flat, with a flange or skirt 132 extending vertically downward for aesthetics and/or added structure. The cover plate 130 includes an appropriate aperture or access point 134 to allow a hitch ball 140 or similar device to be selectively coupled to the receptacle 110 of the underlying apparatus 100. The cover plate 130 may substantially conceal any one of the central intersection 112 and receptacle and, in some instances, portions of cross members 120, 122. It may be possible for cover plate 130 to even cover the ends 124, 126 of the cross members 120, 122, although it must still allow for access to the mounting points 128 (e.g., by constructing members 120, 122 from a hollow tubular material and leaving exposed/open ends 124, 126 so that mounting points 128 can be accessed via the opening—see FIGS. 2, 3, and 5 for examples of this hollow tubular arrangement). The cover plate 130 may simply rest atop the apparatus 110, become attached by insertion of a hitch ball 140 (or other accessories), be permanently coupled to the apparatus, or become coupled by attachment mechanisms or fasteners to selectively secure the plate 130 in place.

Attachment points 150 may be integrally formed or attached to one or both cross members 120, 122. Attachment points 150 may comprise a recessed hook, a quick connect/disconnect mechanism, or other similar structure, with points 150 having particular utility for attaching safety chains. In some aspects, the points 150 are provided as a mirrored pair on each cross member 120, 122 along the length between ends 124, 126 and central intersection 112. In the event cross members 120, 122 have a tubular or partially hollowed construction, it may be possible to form attachment points 150 to leverage the accessibility provided by this construction (e.g., by providing a plurality of holes on a top and/or side facing edge of the members).

Figure 3:
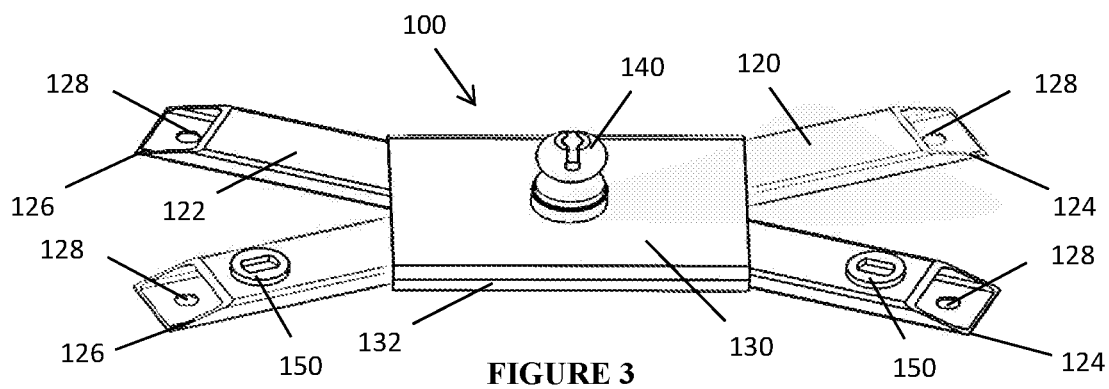
FIG. 3 is a perspective plan view of another aspect of the hitch apparatus according to certain aspects disclosed herein.

If a cover plate 130 is included, the points 150 remain easily accessible in some embodiments by being provided transversely outside of the cover plate 130 as seen in FIG. 3. Alternatively, points 150 could be provided integrally with the cover plate 130, provided the plate 130 is sufficiently sturdy and properly affixed to the assembly 100.

Examples of one type of attachment mechanism 150 may be found in United States Patent Publication 2017/0182855, which is incorporated by reference herein. At least one point 150 should be provided, with two symmetrically spaced points 150 being preferred for securing a safety chain associated with the towed apparatus. A third and/or additional points may be provided to accommodate additional accessories. When a plurality of attachment points are provided, it may be possible to specifically tailor each point to a separate, intended function.

Generally speaking, the apparatus 100 should be symmetric with respect to its load bearing features (i.e., the receptacle 110, the mounting points 128, and (if present) the attachment points 150). This arrangement allows for an even distribution of loads from the towed product, thereby reducing stress and metal fatigue in the receptacle 110 and the apparatus 100 as a whole. The features above also allow for the apparatus 100 to be quickly and easily attached and removed from the truck bed, while simultaneously improving the underside profile of the vehicle by eliminating the need for extensive structure coupling the frame rails underneath the vehicle.

Owing to the use of two essentially identical, intersecting cross members 120, 122, the need for a central body and/or rails is eliminated. Further, because cross members 120, 122 are similar (if not identical) in terms of length, width, and weight, as well as positioning of attachment points and mounting points, manufacture of the apparatus 100 is simplified. This arrangement necessarily imparts an X-shape to the members when they are coupled together, with a pair of supplementary angles defined thereby. In some cases, each of these supplementary angle includes an obtuse angle in the transverse direction T and an acute angle in the longitudinal direction L.

Figure 2:
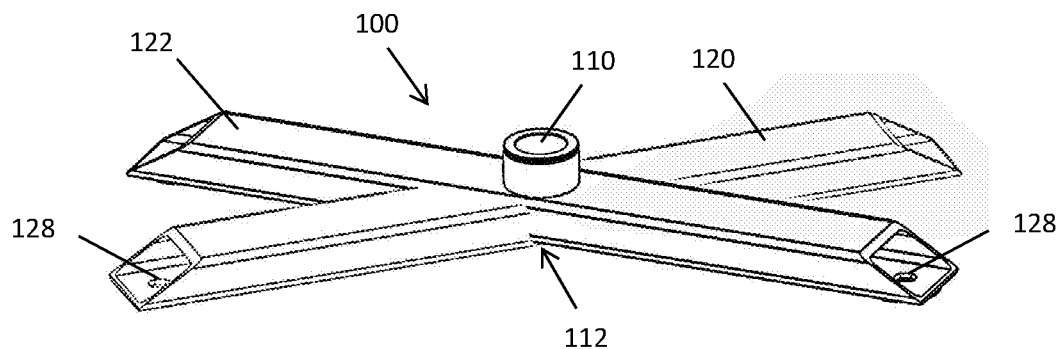
FIG. 2 is a perspective plan view of the hitch apparatus of FIG. 1.
Figure 4:
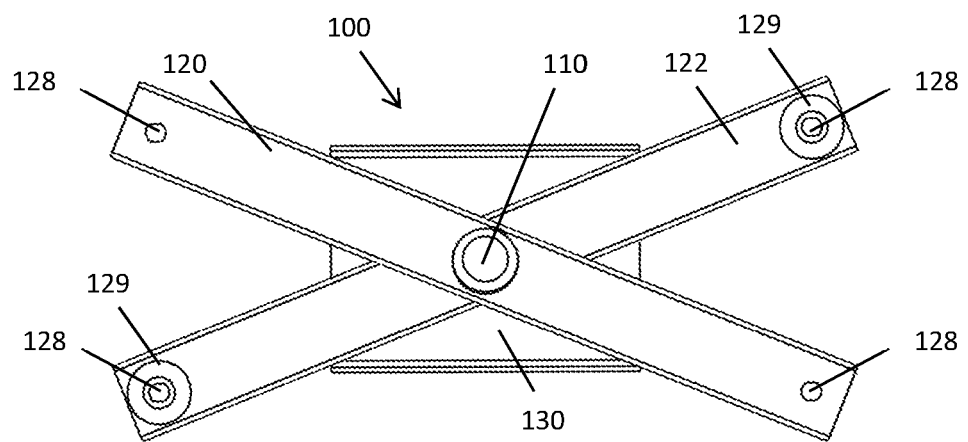
FIG. 4 is a bottom plan view of the hitch apparatus of FIG. 3.
Figure 5:
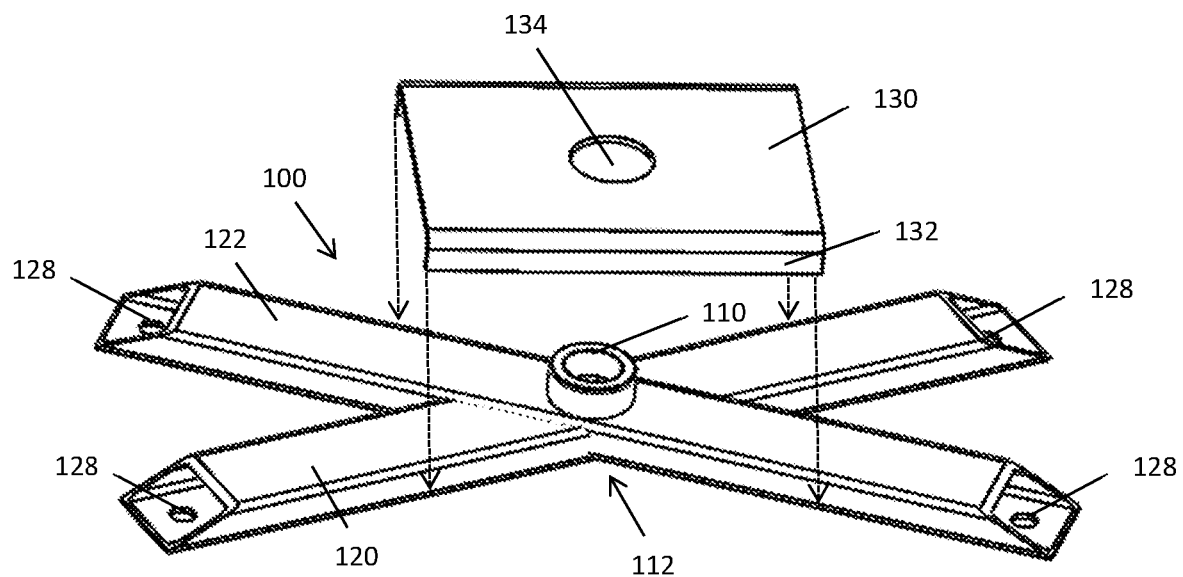
FIG. 5 is an exploded perspective plan view of the hitch apparatus of FIG. 3.

The cope or intersecting cut used to accommodate the connection of members 120, 122 may still create a gap in the elevation of one member (e.g., member 122 in FIG. 2) that is fitted over the top of the other member (e.g., member 120 in FIG. 2, which would stay flush with the vehicle load bed). Stated differently, member 122 may be positioned parallel to the load bed surface owing to the nature of the cope cut. In the event such a gap is created, a pair of spacers 129 may be affixed to the under-facing of member 122. Spacers 129 may be hollow cylinders, as shown in FIG. 4, or one or a series of objects having uniform height. In each case, the height of the spacer is selected to eliminate any gap, so that member 122 remains level and in the same basic planar surface as member 120. Preferably, spacers are positioned proximate to mounting points 128 to ensure the overall stability and strength of assembly 100.

In all cases where components are coupled together (e.g., member 122 to member 120, spacers 129 to member 122, cover plate 130 to members 120, 122, etc.), the respective pieces may be welded, adhered together using appropriate adhesive materials, fastened by way of screws, rivets, pegs, or other fasteners, or formed to create a permanent snap- or interference fit. The strength of the coupling connection must be able to accommodate the anticipated loads and stresses exerted upon the assembly 100 when it is used for its intended purpose.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A gooseneck hitch assembly comprising:
   a pair of intersecting cross members formed into an X shape;
   a receptacle formed at a central intersection of the pair of cross members;
   a first attachment point formed on a top-facing side of one of the pair of cross members and a second attachment point formed on a top-facing side of an other of the pair of cross members;
   mounting points provided at opposing ends of each of the pair of cross members, the mounting points configured to attach to a frame of a vehicle via an underbed attachment system; and
   a cover plate having a skirt attached to the top-facing of the first and second cross members, said cover plate having a through-opening aligned with the receptacle.

2. The gooseneck hitch assembly according to claim 1, wherein the mounting points include at least one of: direct-to-puck connections and quick disconnect mechanisms.

3. The gooseneck hitch assembly according to claim 1, further comprising a receiving opening of the receptacle also exposed along said top-facing side.

4. The gooseneck hitch assembly according to claim 1, wherein the mounting points are formed on an under-facing side of each of the pair of cross members, said under-facing side defining an opposite side relative to a receiving opening of the receptacle.

5. A gooseneck hitch assembly comprising:
   a first cross member having mounting points formed in a bottom-facing side at opposite ends of the cross member;
   a second cross member having mounting points formed in a bottom-facing side at opposite ends of the cross member, wherein the mounting points are configured to attach to a frame of a vehicle via an underbed attachment system;
   wherein the first cross member has a cope or interlocking cut centered at a midpoint of the first cross member to connect with a corresponding cut in the second cross member centered at a midpoint of the second cross member;
   wherein a receptacle having a top-facing side opening is formed in the midpoints of the first and second cross members;
   wherein the first and second cross members, when connected, are symmetrical;
   a first attachment point formed on a top-facing side of one of the pair of cross members and a second attachment point formed on a top-facing side of an other of the pair of cross members; and
   a cover plate having a skirt attached to a top-facing of the first and second cross members, said cover plate having a through-opening aligned with the receptacle.

6. The assembly of claim 5, wherein the first and second cross members, when connected, form a pair of supplementary angles in which each supplementary angle includes one acute angle and one obtuse angle.

7. The assembly of claim 6, wherein the acute angles are transversely opposed and the obtuse angles are longitudinally opposed.

8. The assembly of claim 5, wherein the attachment points are recessed hooks or quick connect/disconnect mechanisms.

9. The assembly of claim 5, wherein the mounting points of the first and second cross members include at least one of: direct-to-puck connections and quick disconnect mechanisms.

10. The assembly of claim 5, wherein spacers are coupled to the first cross member to ensure the first cross member remains level when the mounting points are attached to an underbed attachment system.

11. A gooseneck hitch assembly attachable to an underbed attachment system, the gooseneck hitch assembly comprising:
    a first tubular cross member having mounting points at opposite ends;
    a second tubular cross member having mounting points at opposite ends and a cope or intersecting cut at a midpoint of the second tubular cross member, said cope or intersecting cut securing the first tubular cross member to the second tubular cross member in a symmetrical configuration, wherein the mounting points are configured to attach to the underbed attachment system;
    a receptacle formed at the midpoint; and
    at least one attachment point formed on one or both of the first and second tubular cross members; and
    a cover plate having a skirt attached to a top-facing of the first and second cross members, said cover plate having a through-opening aligned with the receptacle.

12. The gooseneck hitch assembly of claim 11, further comprising a plurality of symmetrically placed spacers coupled to an under-facing side of the first or second tubular cross member.

13. The gooseneck hitch assembly of claim 12, wherein the spacers are positioned proximate to both mounting points.

* * * * *